US008607199B2

(12) United States Patent
Kim et al.

(10) Patent No.: US 8,607,199 B2
(45) Date of Patent: Dec. 10, 2013

(54) TECHNIQUES FOR DEBUGGING CODE DURING RUNTIME

(75) Inventors: Chulho Kim, Poughkeepsie, NY (US); Hanhong Xue, Wappingers Falls, NY (US); Tsai-Yang Jea, Poughkeepsie, NY (US); Hung Q. Thai, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 12/639,459

(22) Filed: Dec. 16, 2009

(65) Prior Publication Data

US 2011/0145791 A1 Jun. 16, 2011

(51) Int. Cl.
G06F 9/44 (2006.01)
(52) U.S. Cl.
USPC ............ 717/124; 717/128; 717/133; 717/163
(58) Field of Classification Search
None
See application file for complete search history.

(56) References Cited

U.S. PATENT DOCUMENTS

| | | | |
|---|---|---|---|
| 6,324,683 B1 * | 11/2001 | Fuh et al. ...................... | 717/124 |
| 6,470,388 B1 * | 10/2002 | Niemi et al. .................. | 709/224 |
| 6,742,177 B1 * | 5/2004 | Dorak et al. .................. | 717/124 |
| 7,243,346 B1 * | 7/2007 | Seth et al. ..................... | 717/163 |
| 7,496,903 B2 | 2/2009 | Rees et al. | |
| 7,506,316 B2 | 3/2009 | Vertes | |
| 7,757,225 B2 * | 7/2010 | Copeland et al. ............. | 717/163 |
| 8,214,819 B2 * | 7/2012 | Mosberger ..................... | 717/163 |
| 8,239,832 B2 * | 8/2012 | Stall et al. ...................... | 717/124 |
| 8,418,149 B2 * | 4/2013 | Krauss ............................ | 717/133 |
| 2003/0061600 A1 * | 3/2003 | Bates et al. .................... | 717/133 |
| 2004/0250164 A1 * | 12/2004 | Ahmad et al. .................. | 714/30 |
| 2005/0022167 A1 * | 1/2005 | Gryko et al. ................... | 717/124 |
| 2007/0168972 A1 * | 7/2007 | Bates et al. .................... | 717/124 |
| 2007/0214342 A1 * | 9/2007 | Newburn et al. ............... | 712/216 |
| 2009/0007075 A1 * | 1/2009 | Edmark et al. ................. | 717/128 |
| 2009/0083715 A1 * | 3/2009 | DeWitt et al. ................. | 717/128 |
| 2009/0089761 A1 * | 4/2009 | Lazzaro et al. ............... | 717/128 |
| 2009/0158260 A1 * | 6/2009 | Moon et al. .................... | 717/133 |
| 2009/0164981 A1 | 6/2009 | Heidasch | |

OTHER PUBLICATIONS

Douglas C. Schmidt, The Service Configurator Framework, Department of Information and Computer Science, 1994, pp. 3-11.*
Michael Welcome, Results of LAPI Performance Tests on the NERSC IBM SP, www.cs.berkeley.edu, 2001, pp. 1-3.*
Krisztian Pocza, Towards Effective Runtime Trace Generation Techniques in the .NET Framework, 2006, pp. 2-7.*
Douglas M. Pase, Dynamic Probe Class Library (DPCL): Tutorial and Reference Guide, 1998, pp. 5-11 and 13-21.*
Ottawa, Proceedings of the Linux Symposium, 2003, pp. 10-19.*

(Continued)

*Primary Examiner* — Thuy Dao
*Assistant Examiner* — Mongbao Nguyen
(74) *Attorney, Agent, or Firm* — Yudell Isidore Ng Russell PLLC

(57) ABSTRACT

A technique for debugging code during runtime includes providing, from an outside process, a trigger to a daemon. In this case, the trigger is associated with a registered callback function. The trigger is then provided, from the daemon, to one or more designated tasks of a job. The registered callback function (that is associated with the trigger) is then executed by the one or more designated tasks. Execution results of the executed registered callback function are then returned (from the one or more designated tasks) to the daemon.

11 Claims, 3 Drawing Sheets

(56) References Cited

OTHER PUBLICATIONS

Kwangyong, L. et al; "A Design and Implementation of a Remote Debugging Environment for Embedded Internet Software"; INSPEC; pp. 199-203; 2001.
Delucia, A. et al; "Program Slicing: Methods and Applications"; INSPEC/IEEE; pp. 142-149; 2001.
Seggelmann, R. et al; :Parallelizing OMeT++ Simulations Using Xgrid; ACM Digital Library; 2009.
Kastner, D. et al; "Generic Control Flow Reconstruction from Assembly Code"; ACM Digital Library; p. 46-58; Jun. 19-21, 2002.
Kunz, T. et al; "Fast Detection of Communication Patterns in Distributed Executions"; ACM Digital Library; 2000.

* cited by examiner

TECHNIQUES FOR DEBUGGING CODE DURING RUNTIME

This invention was made with United States Government support under Agreement No. HR0011-07-9-0002 awarded by DARPA. The Government has certain rights in the invention.

BACKGROUND

1. Field

This disclosure relates generally to debugging code and, more specifically, to techniques for debugging code during runtime.

2. Related Art

Low-level application programming interface (LAPI) is a component of the AIX® operating system implementation of reliable scalable cluster technology (RSCT). LAPI is a message-passing application programming interface (API) that provides a one-sided communication model. In the LAPI communication model, a first task initiates a communication operation to a second task and the completion of the communication does not require the second task to take a complementary action. A LAPI library provides basic operations that facilitate storing data to and retrieving data from one or more virtual addresses of a remote task. LAPI provides a message infrastructure that allows a programmer to install a set of handlers that are called and run in an address space of a target task on behalf of a task originating a message. LAPI may provide flow control and support for: large messages; generic non-contiguous messages; non-blocking calls, interrupt and polling modes, efficient exploitation of network switch functions, and event monitoring (to simulate blocking calls, for example) for various types of completion events.

A programmer may interact with LAPI through an object called a LAPI handle (also referred to as a LAPI instance or a LAPI context). Usually, LAPI function calls take a LAPI handle as a first argument. LAPI provides a number of methods for transferring non-contiguous data (such as multiple buffers), repeating block/stride descriptions, and implementing data gather/scatter programs (DGSPs). For LAPI communication operations, origin (or source) denotes a task that initiates a LAPI operation and target (or destination) denotes a task where an address space is accessed during the operation. A push operation transfers data from the origin task to the address space of the target task. A pull operation transfers data from the address space of the target task into the address space of the origin task.

LAPI can be run in either a polling mode or an interrupt mode. In the polling mode, the sending and receiving of messages only happens when a programmer explicitly calls a LAPI function. In the interrupt mode, a receive interrupt is generated for incoming messages. In general, a control thread, which LAPI creates at initialization, handles interrupts. Using the LAPI query function, a programmer can query statistics related to data that is transferred using a user space (US) protocol or a user datagram protocol/Internet protocol (UDP/IP), through intra-task local copy or shared memory. LAPI includes a profiling interface that has wrappers (for each LAPI function) that facilitate collecting data about each LAPI call.

Compared to other communication protocols, such as the message passing interface (MPI) and the Internet protocol (IP), LAPI provides a lower level interface to a network switch. As is known, MPI is a specification for an API that allows computers to communicate with one another. The MPI may be, for example, employed in computer clusters and supercomputers. Applications that are written using LAPI can be run over a cluster of processors running, for example, AIX 5L® or Linux™.

LAPI subroutines provide a wide variety of functions that can be used to obtain most behaviors required from a parallel programming API. LAPI functions also usually provide: C and FORTRAN subroutine bindings; extern "C" declarations for C++ programming; and profiling interfaces for C, C++, and FORTRAN programs. Complementary functions may be implemented to provide for checking completion of operations and for enforcing relative ordering, if desired. Additionally, LAPI functions allow tasks to exchange addresses that will be used in LAPI operations.

LAPI functions (and related subroutines) include: functions to initialize and terminate LAPI; functions to query and set up a runtime environment; and address-related functions. LAPI uses a number of internal structures to enable LAPI to perform message-passing operations on behalf of a user. As one example, the LAPI_Init subroutine is used to allocate memory for LAPI communication structures and to initialize the communication structures. The LAPI_Init subroutine returns a unique handle that represents a single LAPI communication context. The handle is subsequently passed as a parameter to each of the other LAPI functions. The LAPI_Init subroutine reads in various environment variables and sets up various communication channels based on the values of the variables.

As another example, the LAPI_Term subroutine is used to free memory associated with LAPI communication structures. The LAPI_Term subroutine takes a LAPI handle as a parameter and uses the handle to terminate the corresponding communication context. Once the LAPI_Term subroutine is called, no farther LAPI communication can be performed on a handle that has been terminated. Typically, the LAPI_Init subroutine is called once at the beginning of a user program and the LAPI_Term subroutine is called just before the user program terminates.

A number of different variables constitute a LAPI runtime state. Many of the variables can be queried at runtime to affect operation of a user program. For example, it is often useful to know the number of tasks in a given job as well as the identity of a current task and to design a user program to take actions according to the values. Many LAPI runtime state variables can also be set to alter LAPI behavior through job execution and to tune LAPI performance. For example, it may be useful to turn off interrupts to signal incoming packets when a user program explicitly makes a number of calls to various LAPI progress routines.

Various tasks implemented with a LAPI framework may require debugging. Traditionally, debugging code has been difficult without adding traces to an application and shared libraries that the application invokes. Moreover, debugging tasks implemented within a LAPI framework has usually required halting and restarting the task during debugging. While a signal (which is a limited form of inter-process communication used in Unix, Unix-like, and other portable operating system interface for Unix (POSIX) compliant operating systems) may be used to initiate debugging, when a signal is sent to a process an operating system interrupts the normal flow of execution of the process. Furthermore, signal handling is limited in that an invoked function cannot pass arguments (or parameters). Moreover, a signal handler is limited in that only a single signal can be handled by a single registered function. Furthermore, when conventional signal handlers are employed, adding new functions to an application without re-compiling the application is complicated. While the problems associated with using conventional signal handlers may be addressed using environment variables or files, the use of an environment variable requires restarting of an application in order for a new environment variable to take effect. In addition, employing files can cause resource/lock issues.

In computer programming, a callback function is executable code that is passed as an argument to other code. A callback function allows a lower-level software layer to call a subroutine or function that is defined in a higher-level layer. In general, callback functions have a variety of uses. For example, writing a function that reads a configuration file and associates values with options (which are identified by a hash) as a callback function makes the function more flexible. In this case, a user of the function can use any desired hashing algorithm and the function will continue to work as the function uses the callback to turn option names into hashes. Another use of callbacks is in error signaling. A programmer may register a clean-up function as a callback function when the programmer does not want a program to terminate immediately (to ensure things get taken care of) when the program receives a signal. Callback functions may also be used to control whether a function acts.

SUMMARY

According to one aspect of the present disclosure, a technique for debugging code during runtime includes providing, from an outside process, a trigger to a daemon. In this case, the trigger is associated with a registered callback function. The trigger is then provided, from the daemon, to one or more designated tasks of a job. The registered callback function (that is associated with the trigger) is then executed by the one or more designated tasks. Execution results of the executed registered callback function are then returned (from the one or more designated tasks) to the daemon.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
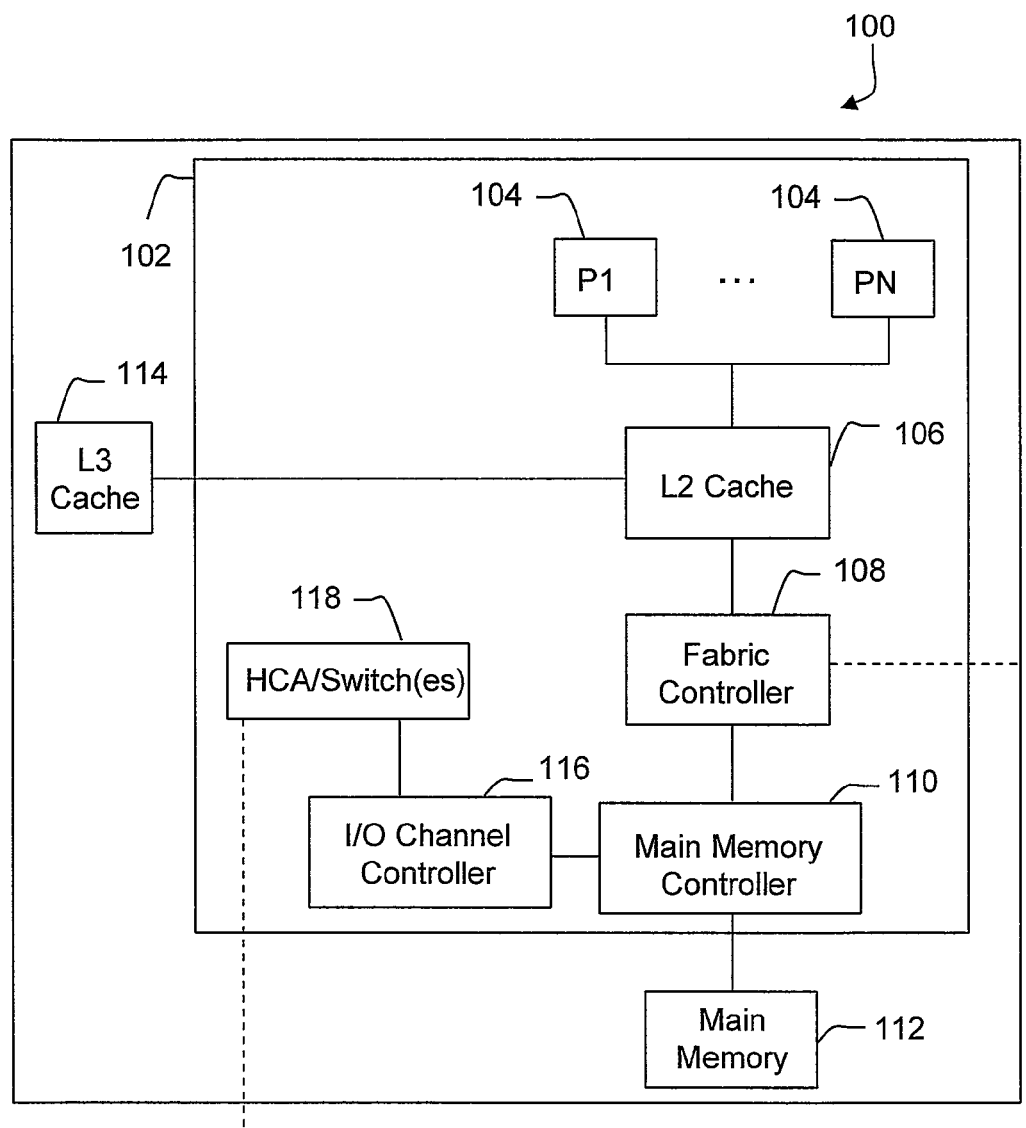
FIG. 1 is a diagram of a relevant portion of an example node, of an example high performance computing (HPC) cluster that includes a symmetric multiprocessor (SMP), that may be configured to debug code according to the present disclosure.

As will be appreciated by one of ordinary skill in the art, the present invention may be embodied as a method, system, or computer program product. Accordingly, the present invention may take the form of an entirely hardware embodiment, an entirely software embodiment (including firmware, resident software, microcode, etc.), or an embodiment combining software and hardware aspects that may all generally be referred to herein as a "circuit," "module," or "system." Furthermore, the present invention may take the form of a computer program product on a computer-usable storage medium having computer-usable program code embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium include: a portable computer diskette, a hard disk, a random access memory (RAM), a read-only memory (ROM), an erasable programmable read-only memory (EPROM) or Flash memory, a portable compact disc read-only memory (CD-ROM), an optical storage device, or a magnetic storage device. It should be noted that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that can store the program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, or other programmable data processing apparatus to produce a machine, such that the instructions, which execute via the one or more processors of the computer or other programmable data processing apparatus, create means for implementing the functions/acts specified in the flowchart and/or block diagram block or blocks.

The computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus implement the functions/acts specified in the flowchart and/or block diagram block or blocks.

As may be used herein, the term "coupled" includes both a direct electrical connection between blocks or components and an indirect electrical connection between blocks or components achieved using one or more intervening blocks or components. As used herein, the term "task" is synonymous with a user application. As may be used herein, a 'direct LAPI user' is a user that codes directly to a low-level application programming interface (LAPI) layer and an 'indirect LAPI user' is a user that codes to a non-LAPI layer (e.g., a message passing interface (MPI) layer). As is used herein, the term 'job' refers to a collection of related tasks. While the discussion herein focuses on implementing the disclosed techniques in conjunction with a LAPI framework, it should be appreciated that the disclosed techniques are not so limited and may be implemented in conjunction with a wide variety of frameworks.

As noted above, traditionally, debugging code has been difficult without adding traces to an application and shared libraries that the application invokes. While signal handling may be employed to invoke a user function (i.e., trigger a predefined behavior from outside an application), signal handling is limited in that an invoked function cannot pass arguments (or parameters). Moreover, a signal handler is limited in that only a single signal can be handled by a single registered function. Furthermore, when conventional signal handlers are employed, adding new functions to an application without re-compiling the application is complicated. While the problems associated with using conventional signal handlers may be addressed using environment variables or files, the use of an environment variable requires restarting an application in order for a new environment variable to take effect. In addition, employing files can cause resource/lock issues.

According to various aspects of the present disclosure, a plug-in architecture for application and shared library writers is disclosed that facilitates debugging code without having to re-compile the code with tracing enabled. As disclosed herein, the plug-in architecture is implemented in a low-level application programming interface (LAPI) product. While the discussion herein focuses on implementation in conjunction with a LAPI product, is should be appreciated that the techniques disclosed herein are not limited to implementation in conjunction with a LAPI product.

According to the present disclosure, each user application is configured with an established connection to an application monitoring daemon (also referred to as a protocol network services daemon (PNSD)). The daemon acts as an agent to forward commands (e.g., pnsd_trigger) to applications from an outside process (i.e., a process executing outside the applications). According to the present disclosure, a user can register any number of callback/trigger functions (which can implement debugging or non-debugging functions) using interfaces provided by a LAPI product. In various embodiments, a user issues a command with a name of a callback function and any number (zero or more) of arguments (through the daemon) to a task. A designated task then executes the specified callback function with the provided parameters. Following execution of the callback function, results of the callback function may then be returned to the outside process.

The daemon may also be configured to act as a data/status gathering and storage device (e.g., to store execution statistics of an application that can be redirected to a user designated file or displayed on a console). For example, a set of application programming interfaces (APIs) may be implemented that allows a user to create and register callback functions. The registered callback functions can be invoked through the LAPI framework at runtime to, for example, alter a behavior of an associated application. A user may, for example, utilize an external command to load a new functional module into an application that is executing. The functional module (e.g., a debug module) may then be invoked by the external command (or by another external command) that caused the functional module to be loaded into the application.

According to one aspect of the present disclosure, two LAPI utility (LAPI_Util) types are employed to allow a user to add (register) or remove (de-register) callback functions with the LAPI framework. The two LAPI_Util types may take the following form:

```
typedef struct {
lapi_util_type_t Util_type; // LAPI_TRIGGER_ADD
int (*trigger)(lapi_handle_t hndl, int argc, char
*argv[ ]);
char *trigger_name;
} lapi_trigger_util_t;
typedef struct {
lapi_util_type_t Util_type; // LAPI_TRIGGER_REMOVE
int (*trigger)(lapi_handle_t hndl, int argc, char
*argv[ ]);
char *trigger_name;
} lapi_trigger_util_t;
```

It should be appreciated that the trigger function takes the parameters argc and argv as a regular C language main( ). As such, a user can implement virtually any action in a trigger function.

A command is also implemented to trigger runtime behavior of the LAPI tasks. For example, a command (pnsd_trigger) may take the following form:

```
pnsd_trigger -h
pnsd_trigger [-v] [-d] job_id
pnsd_trigger [-v] [-l] job_id
pnsd_trigger [-v] [-t timeout] -j job_id trigger_name [argument ...]
``` where -h implements a help function, -v implements a verbose mode, -d job_id causes contents of LAPI objects of specified job identifier (ID) to be dumped, -l job_id causes all registered triggers of the specified job ID to be listed, -t timeout specifies a timeout in seconds for the trigger, -j job_id trigger name specifies a target job ID to invoke the trigger, trigger_name is the name of the trigger, and argument . . . is a space-separated list of arguments for the trigger. It should be appreciated that other commands may be implemented to cause tasks to load modules that contain new functionality and execute the modules without changing/recompiling the source code of an application and/or shared library.

It should be appreciated that the techniques disclosed herein that are employed to load an external module into an application are different from approaches that load an external module employed in conventional plug-in style applications. For example, in conventional plug-in style applications (e.g., Firefox™), an application decides when and how to load a new module. In contrast, according to the present disclosure, a new module is loaded by an application according to a command sent from an outside process. The command may be, for example, sent from a user generated debug console that interfaces with the LAPI framework.

According to one or more embodiments, when a task terminates, a connection is made to the daemon to save statistics and the information to identify the statistics for later query is displayed. When the daemon receives and saves the statistics from the task, the daemon may also accumulate the statistics for an associated job, user, and node. After a job has finished, a user may query statistics with a command (e.g., pnsd_stat) by specifying a task or a job. The user may also query aggregated user and/or node statistics.

With reference to FIG. 1, an example node 100 of an HPC cluster is illustrated that includes one or more chip-level multiprocessors (CMPs) 102, each of which includes multiple (e.g., two to eight processor cores) processors 104. The processors 104 may, for example, operate in a simultaneous multithreading (SMT) mode or a single thread (ST) mode. When the processors 104 operate in the SMT mode, the processors 104 may employ multiple separate instruction fetch address registers to store program counters for multiple threads. In at least one embodiment, the processors 104 each include a first level (L1) cache memory (not separately shown in FIG. 1) that is coupled to a shared second level (L2) cache memory (cache) 106, which is coupled to a shared third level (L3) cache 114 and a fabric controller 108.

As is illustrated, the fabric controller 108 is coupled to a memory controller (e.g., included in a Northbridge) 110, which is coupled to a memory subsystem 112. In alternative embodiments, the fabric controller 108 may be omitted and, in this case, the L2 cache 106 may be directly connected to the main memory controller 110. The memory subsystem 112 includes an application appropriate amount of volatile and non-volatile memory. The fabric controller 108, when implemented, facilitates communication between different CMPs and between the processors 104 and the memory subsystem 112 and, in this manner, functions as an interface.

It should be appreciated that the various techniques disclosed herein are equally applicable to systems that employ separate L2 caches for each processor, as well as systems that employ separate L2 and L3 caches for each processor. Each of the L1, L2, and L3 caches may be combined instruction and data caches or correspond to separate instruction and data caches. As is shown in FIG. 1, the main memory controller 110 is also coupled to an I/O channel controller (e.g., included in a Southbridge) 116, which is coupled to a host channel adapter (HCA)/switch(es) block 118. The HCA/switch(es) block 118 includes an HCA and one or more switches that may be utilized to couple the CMP 102 to CMPs in other nodes (e.g., I/O subsystem nodes and processor nodes) of the cluster.

Figure 2:
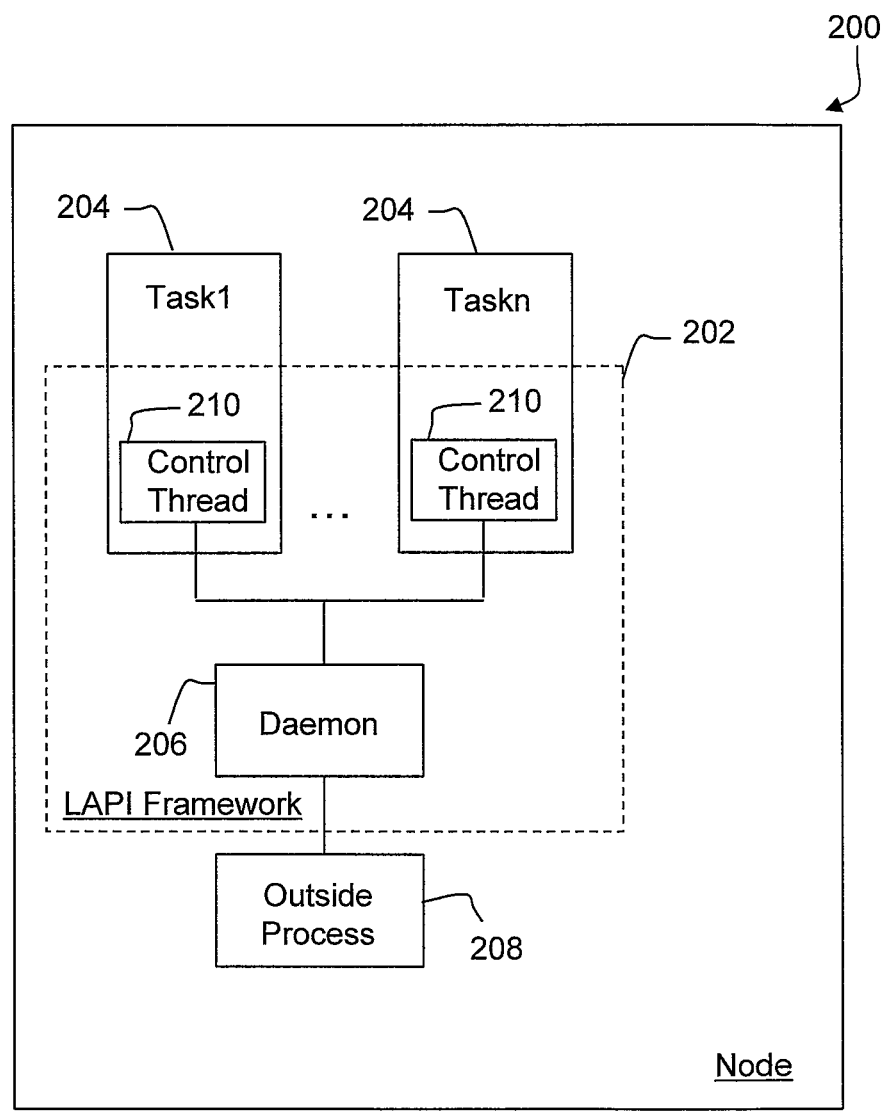
FIG. 2 is a diagram of an example process for debugging code, according to one embodiment of the present disclosure.

With reference to FIG. 2, an example node 200 (of an HPC cluster) is configured to execute a daemon (PNSD) 206, tasks (labeled 'Task1' through 'Taskn') 204, and an outside process 208 (which is external to the tasks 204). The outside process 208 (which may execute on one or more processors of the node 200) communicates with the daemon 206. As is illustrated, the daemon 206 communicates with the tasks 204 (via respective control threads 210 in the tasks 204). In this example, the tasks 204 correspond to user applications that require debugging. In one or more embodiments, the daemon 206 is configured to handle triggers for multiple jobs, each of which include multiple tasks.

In various disclosed embodiments, the control threads 210 are respectively incorporated within each of the tasks 204 and the daemon 206 is incorporated within a LAPI framework 202. The control threads 210 are created (by the LAPI framework 202) at initialization to handle interrupts. The control threads 210 may be, for example, implemented as helper threads within a LAPI communication library (not separately shown). The control threads 210 invoke a designated callback function (when a trigger is received from the outside process 208) and facilitate communication between one or more designated tasks and the daemon 206.

Figure 3:
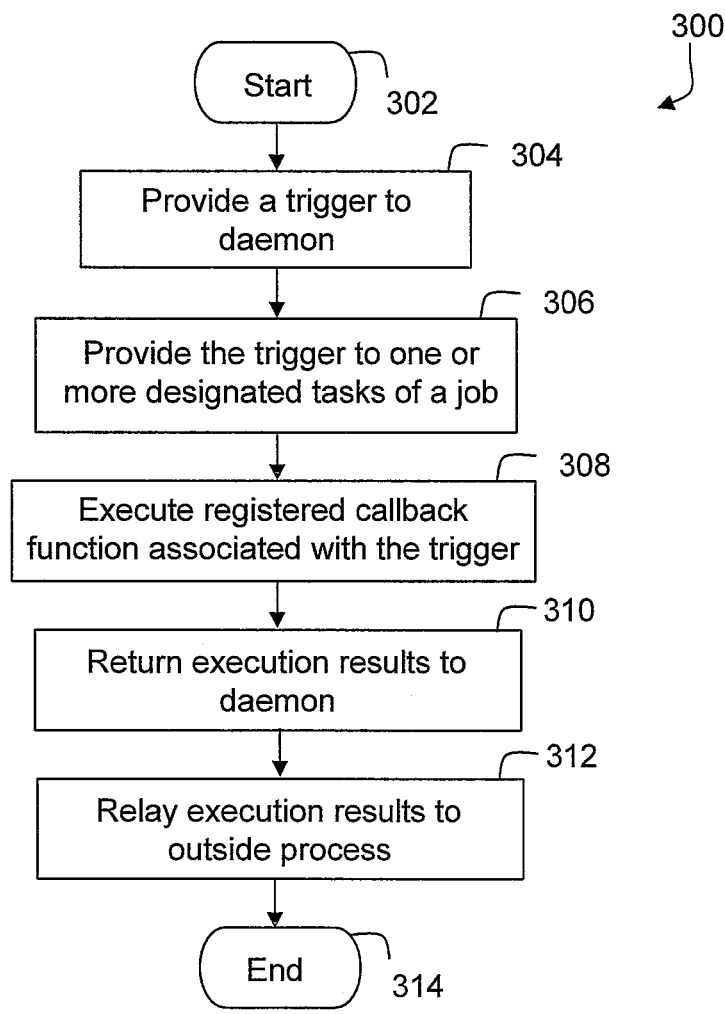
FIG. 3 is a flowchart of an example process for debugging code, according to another embodiment of the present disclosure.

With reference to FIG. 3, a process 300 for debugging code during runtime is initiated in block 302. Next, in block 304, an outside process (e.g., the outside process 208 of FIG. 2) provides a trigger to a daemon (e.g., the daemon 206 of FIG. 2), which is included within a LAPI framework. In this case, the trigger is associated with a registered callback function. Then, in block 306, the daemon (e.g., the daemon 206 of FIG. 2) provides the information of the trigger to be invoked to one or more designated tasks of a job (e.g., the tasks 204 of FIG. 2). Next, in block 308, the registered callback function (that is associated with the trigger) is executed by the one or more designated tasks. Then, in block 310, the tasks return the execution results to the daemon. Next, in block 312, the daemon relays the execution results to the outside process (e.g., the outside process 208 of FIG. 2). Following block 312, control transfers to block 314 where the process 300 terminates and control returns to a calling routine.

Accordingly, a number of techniques have been disclosed herein that facilitate modifying code during runtime without recompiling the code. The techniques are particularly advantageous when employed to modify code to execute one or more debug modules during runtime.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for debugging code during runtime, comprising:
   providing, from an outside process, a trigger to a daemon, wherein the trigger is associated with a registered callback function;
   providing, from the daemon, the trigger to one or more designated tasks of a job;
   executing, by the one or more designated tasks, the registered callback function associated with the trigger, wherein the registered callback function, when executed, alters functionality of the code at runtime without requiring recompilation of the code with tracing enabled; and
   returning, from the one or more designated tasks to the daemon, execution results of the registered callback function, wherein the code includes an application and one or more shared libraries and the registered callback function performs a debugging function.

2. The method of claim 1, further comprising:
   registering the callback function with a low-level application programming interface (LAPI) using a LAPI utility, wherein a control thread that is created at LAPI initialization invokes the callback function and facilitates communication between the one or more designated tasks and the daemon when the trigger is detected by the control thread.

3. The method of claim 1, wherein the trigger has an associated trigger name, a job identification, and one or more trigger arguments.

4. The method of claim 1, further comprising:
   communicating the execution results from the daemon to the outside process.

5. A computer program product for debugging code during runtime embodied on a tangible computer-readable storage memory device, wherein the computer program product, when executed by a data processing system, is configured to:
   receive, from an outside process, a trigger at a daemon, wherein the trigger is associated with a registered callback function;
   provide, from the daemon, the trigger to one or more designated tasks of a job;
   execute, by the one or more designated tasks, the registered callback function associated with the trigger, wherein the registered callback function, when executed, alters functionality of the code at runtime without requiring recompilation of the code with tracing enabled; and
   return, from the one or more designated tasks to the daemon, execution results of the registered callback function, wherein the code includes an application and one or more shared libraries and the registered callback function performs a debugging function.

6. The computer program product of claim 5, wherein the computer program product, when executed, is further configured to:
   register the callback function with a low-level application programming interface (LAPI) using a LAPI utility, wherein a control thread that is created at LAPI initialization invokes the callback function and facilitates communication between the one or more designated tasks and the daemon when the trigger is detected by the control thread.

7. The computer program product of claim 5, wherein the trigger has an associated trigger name, a job identification, and one or more trigger arguments.

8. The computer program product of claim 5, wherein the computer program product, when executed, is further configured to:
   communicate the execution results from the daemon to the outside process.

9. A computer system, comprising:
   a memory subsystem configured to store code; and
   one or more processors coupled to the memory subsystem, wherein the one or more processors are configured to:
   receive, from an outside process, a trigger at a daemon, wherein the trigger is associated with a registered callback function;
   provide, from the daemon, the trigger to one or more designated tasks of a job;
   execute, by the one or more designated tasks, the registered callback function associated with the trigger, wherein the registered callback function, when executed, alters functionality of the code at runtime without requiring recompilation of the code with tracing enabled; and
   return, from the one or more designated tasks to the daemon, execution results of the registered callback function, wherein the code includes an application and one or more shared libraries and the registered callback function performs a debugging function.

10. The computer system of claim 9, wherein the one or more processors are further configured to:
    register the callback function with a low-level application programming interface (LAPI) using a LAPI utility, wherein a control thread that is created at LAPI initialization invokes the callback function and facilitates communication between the one or more designated tasks and the daemon when the trigger is detected by the control thread.

11. The computer system of claim 9, wherein the trigger has an associated trigger name, a job identification, and one or more trigger arguments.

* * * * *